United States Patent
Hearn et al.

(10) Patent No.: US 8,516,531 B2
(45) Date of Patent: Aug. 20, 2013

(54) REDUCING CHANNEL CHANGE DELAYS

(75) Inventors: John P. Hearn, New Providence, NJ (US); Kim N. Matthews, Watchung, NJ (US); Lesley Jen-Yuan Wu, Parsippany, NJ (US)

(73) Assignee: Alcatel Lucent, Paris (FR)

( * ) Notice: Subject to any disclaimer, the term of this patent is extended or adjusted under 35 U.S.C. 154(b) by 1168 days.

(21) Appl. No.: 11/516,418

(22) Filed: Sep. 6, 2006

(65) Prior Publication Data

US 2007/0280298 A1 Dec. 6, 2007

Related U.S. Application Data

(60) Provisional application No. 60/809,921, filed on May 31, 2006.

(51) Int. Cl.
*H04N 7/173* (2011.01)
*H04N 7/00* (2011.01)

(52) U.S. Cl.
USPC .............. 725/94; 725/95; 725/97; 348/114

(58) Field of Classification Search
None
See application file for complete search history.

(56) References Cited

U.S. PATENT DOCUMENTS

| | | | |
|---|---|---|---|
| 7,793,329 B2 * | 9/2010 | Joshi et al. ............... | 725/120 |
| 2005/0183120 A1 * | 8/2005 | Jain et al. ............... | 725/46 |
| 2006/0117359 A1 | 6/2006 | Baldwin et al. | |
| 2007/0107026 A1 * | 5/2007 | Sherer et al. ............. | 725/97 |
| 2007/0204320 A1 * | 8/2007 | Wu et al. ............... | 725/135 |
| 2007/0214490 A1 * | 9/2007 | Cheng et al. ............ | 725/135 |
| 2007/0277219 A1 * | 11/2007 | Toebes et al. ........... | 725/139 |
| 2008/0059724 A1 * | 3/2008 | Stifter, Jr. ............... | 711/154 |
| 2011/0162024 A1 * | 6/2011 | Jagadeesan et al. .... | 725/110 |

* cited by examiner

*Primary Examiner* — Chris Parry
*Assistant Examiner* — Omar S Parra
(74) *Attorney, Agent, or Firm* — Brosemer, Kolefas & Associates, LLC

(57) ABSTRACT

Technology which facilitates a reduction in time of the presentation of video content after a viewer changes channels is described. Frames of a video stream associated with a channel are analyzed to identify locations of access points in the video stream prior to relaying the video stream to a presentation device. Information indicating the locations of access points is stored. The video stream is then time shifted on a continuous basis and is transmitted to the presentation device which made the request for as long as the presentation device remains tuned to the channel corresponding to the request. A first available frame on or before an access point of the time shifted video stream is selected based on the stored information, which is used to commence the transmission of the time shifted video to the presentation device, which facilitates a more immediate presentation of video content.

20 Claims, 5 Drawing Sheets

REDUCING CHANNEL CHANGE DELAYS

CROSS-REFERENCE TO RELATED APPLICATIONS

The present patent application claims benefit of U.S. Provisional Application Ser. No. 60/809,921 filed on 31 May 2006.

TECHNICAL FIELD

This invention relates generally to technology used to reduce the amount of time between when a user selects a new channel on his/her television and when the first picture is displayed.

BACKGROUND

Broadband providers (e.g., cable, satellite, DSL or fiber-optic-to-home providers) often deliver a real-time broadcast of a digital video multicast data stream (video stream) to subscribers over an internet protocol (IP) network. The video stream may include a real-time broadcast digitally encoded from an analog broadcast feed or program files already encoded in a digital format. When video is streamed, the incoming video stream is buffered at a subscriber's receiving device such as a set-top box or decoder. The buffer is continually emptied of data, decoded, and presented to the subscriber via a presentation device such as a TV. In the mean time, more data is received by the receiving device which refills the buffer, so there is a smooth presentation of data images on the screen of the presentation device.

Predominantly, the video streams are delivered to subscribers' receiving devices using digital video compression and transmission formats from a standard body known as the Moving Picture Experts Group (MPEG), although there are other types video compression and transmission formats (such as H.264). The video stream configured by the MPEG standard typically includes different types of frames, relationships between frames, and a prescribed order of the different types of frames.

The video stream is received by the receiving device (e.g., decoder) located at a subscriber's premises, which decodes the frames of the video stream so it can be displayed on the screen of a presentation device. To reduce bandwidth there are only a limited number of a particular types of frames, known as access points, in a video stream which allow decoders to decode a video stream after the decoder initially joins an incoming video stream. Unfortunately, a decoder must wait for these limited numbers of access points to arrive and then be decoded, before the decoder is able to display the first pictures of the video stream on the screen of a presentation device.

This is problematic for subscribers when they make a channel change request usually via a remote control, because there is a delay period experienced by the subscriber between the time the subscriber makes a channel change request and the subscriber is first presented with the first image of a frame of the video stream associated with the channel requested. During this delay period the screen of a presentation device is usually blank other than programming information. This phenomenon is known as a "channel change delay." This delay has grown from milliseconds to seconds with the current generation of new video delivery technology. Accordingly, channel change delay, which was once unnoticed, has increased to the point that viewers of video broadcasts received over IP distribution systems are unable to channel surf effectively without experiencing annoying delay periods.

Thus, there is an unsolved need to adequately reduce channel change delays that often occur when subscribers change channels in a video broadcast over IP network environment.

SUMMARY

Described herein is a technology which facilitates reducing the amount of time between when a user selects a new channel and when the first frames of a picture are actually displayed as images on the screen of a presentation device (such as, but not necessary limited to, a television set). The strategy of the technology is to preprocess a video stream at one or more intermediary nodes in a video over IP network prior to finally transmitting the video stream to the presentation device. Preprocessing of the video stream eliminates delays associated with processing that often occurs when the video stream is received by presentation devices (i.e., equipment located at the end user's premises such as a set-top-box or decoder). More particularly, the preprocessing permits access points to be identified, selected, and delivered to a presentation device for immediate consumption by a decoder, and then almost immediate display on the screen of images associated with the video stream of the channel requested by a user.

One example of how the preprocessing may be performed is described as follows: frames of a video stream associated with a channel are analyzed to identify locations of access points in the video stream prior to relaying the video stream to a presentation device. Information indicating the locations of access points is stored. The video stream is then time shifted on a continuous basis and is transmitted to the presentation device which made the request for as long as the presentation device remains tuned to the channel corresponding to the request. A first available frame on or before an access point of the time shifted video stream is selected based on the stored information, which is used to commence the transmission of the time shifted video to the presentation device, which facilitates a more immediate presentation (e.g., launching/displaying) of video content images.

Another feature and advantage of this preprocessing scheme, is that there is no attempt to synchronize and switch between the time shifted video stream and the source video stream. As the link between the presentation device (such as a set top box) and the video over IP network is not shared with other presentation devices of different customer locations, the link is a point-to-point stream. Accordingly, there is no benefit to switch to the original source video stream after transmitting the time shifted video, as doing so, significantly increases bandwidth on the access link between the video over IP network and the customer's premises. Furthermore, non-trivial modifications need to be made to standard set top boxes or decoders used in conjunction with presentation devices to be able to facilitate the operation of switching back to the original source video stream. Accordingly, the present invention is compatible with standard equipment and does not necessarily require modifications to the set top boxes.

Additional exemplary implementations and features/advantages are described in the Detailed Description in conjunction with the accompanying drawings below. The scope of the invention is recited in the Claims.

BRIEF DESCRIPTION OF THE DRAWINGS

The detailed description is explained with reference to the accompanying figures. In the figures, the left-most digit(s) of a reference number identifies the figure in which the reference number first appears.

DETAILED DESCRIPTION

Introduction

Figure 1:
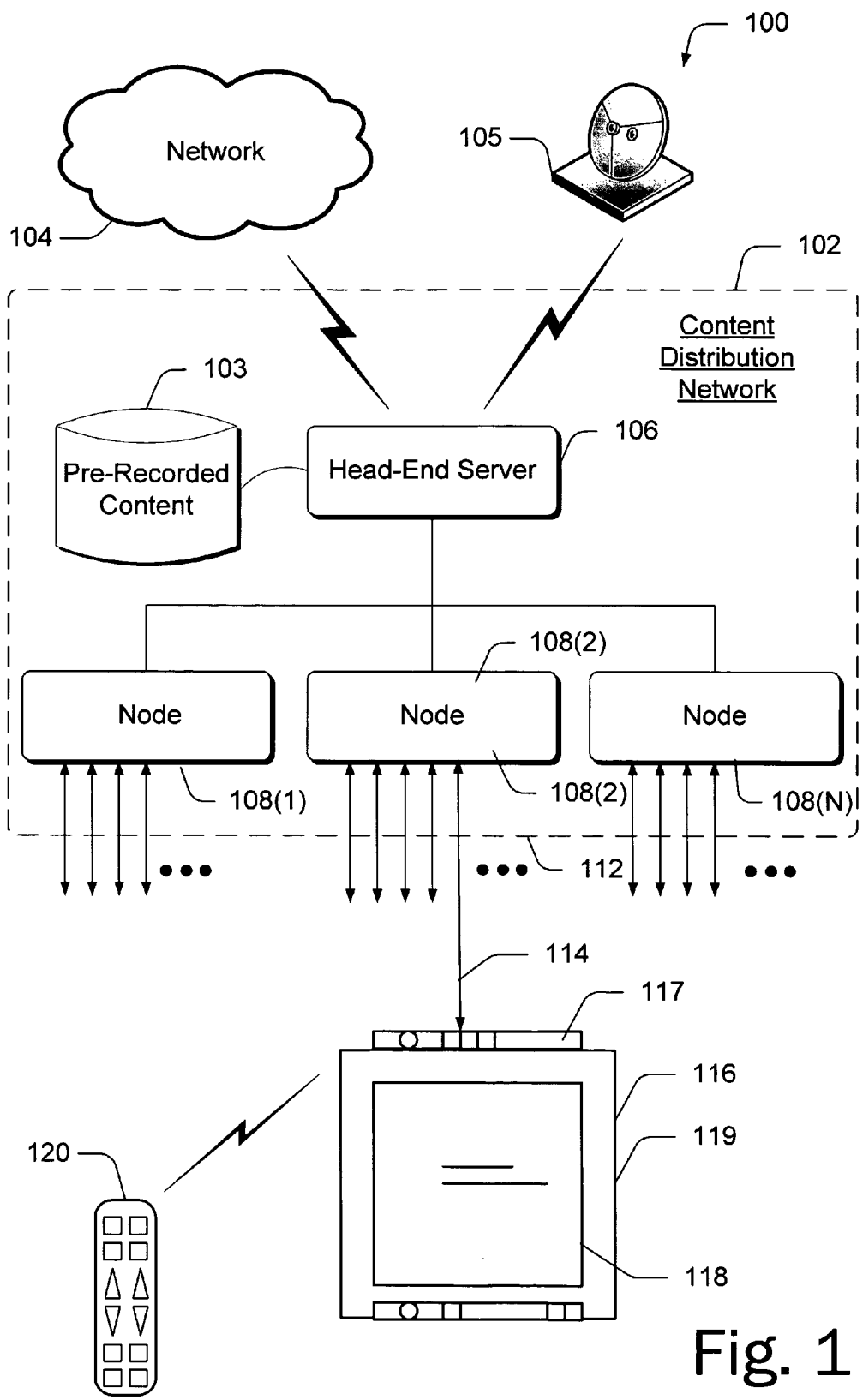
FIG. 1 illustrates an exemplary environment within which the present invention can be either fully or partially implemented.

This invention is directed to reducing delays in the presentation of video content on a screen of a presentation device, such as a TV, after a channel change request is made by an individual.

Reference herein to "one embodiment", "an embodiment", or similar formulations herein, means that a particular feature, structure, operation, or characteristic described in connection with the embodiment, is included in at least one embodiment of the present invention. Thus, the appearances of such phrases or formulations herein are not necessarily all referring to the same embodiment. Furthermore, various particular features, structures, operations, or characteristics may be combined in any suitable manner in one or more embodiments.

In the following description, for purposes of explanation, specific numbers, materials and configurations are set forth in order to provide a thorough understanding of the present invention. However, it will be apparent to one skilled in the art that the present invention may be practiced without each specific example. In other instances, well-known features are omitted or simplified to clarify the description of the exemplary embodiments of the present invention, and thereby, to better explain the present invention.

The inventors intend these embodiments to serve as representative illustrations and examples. The inventors do not intend these embodiments to limit the scope of the claims; rather, the inventors have contemplated that the claimed invention might also be embodied and implemented in other ways, in conjunction with other present or future technologies.

This discussion assumes that the reader is familiar with basic operating principles of digital video compression and transmission standard formats, such as the Moving Picture Experts Group (MPEG,) used for coding and decoding audio/video data. Nevertheless, a general introduction to a MPEG technology is provided to better understand the general problem encountered by the inventors and exemplary implementations to solve them.

Video compression technologies have allowed broadband providers to offer more services based only on moderately upgraded distribution infrastructures. In the case of the new video over IP architectures currently under development, the distribution network and the acceptable business models would not be possible without video compression. However, video compression comes at a cost of equipment, error tolerance and, importantly random access start time. Most high efficiency digital video compression algorithms used today are based on temporal prediction, in which each frame in the sequence of frames is predicted from previously encoded and transmitted frames. Schemes based solely on prediction, however, do not allow for the decoding of video starting at random points in a sequence of video.

Hence all compression schemes included the occasional transmission of access frames, called "intra-frames" or I-frames. The intra-frame is typically considered to be the fundamental frame type of a digital video signal. Only I-frames can be used to completely reconstruct a video picture without reference to other previously decoded video pictures. I-frames require a large amount of data; therefore, transmitting a large number of them reduces network bandwidth. The frequency of these I-frames is therefore one of the key factors in defining the time a user may wait between requesting a new program his/her remote control, and the first picture being displayed on the TV.

Again, I-frames come at the cost of compression efficiency, because they are not predicted from previous frames, the quantity of bits required to encode an I-frame can be several times larger than required for other types of predicted frames. Hence manufacturers of high efficiency video compression encoders prefer that the frequency of I-frames is reduced to a minimum. However, other picture coding types, known as P-frames and B-frames, used for spatial and temporal compression reference an I-frame in the stream, and as a consequence, an end-viewer device cannot completely reconstruct a picture without a minimum number of I-frames. For example, MPEG-2 based systems require a minimum I-frame frequency of about 2 Hz. This minimum was set, in part as well, because of the use of integral implementations of MPEG-2's floating-point transforms, which introduce rounding errors in decoders over several frames. Newer codecs, which are being used outside the domain of standard bodies and which use perfectly reversible integer transforms, are increasingly using longer I-frames spacing in order to minimize bandwidth usage.

There are several other reasons for the delay in seeing the first picture during a channel change. Periodically embedded into the compressed bit stream are several pieces of data that are only required for initial set-up of a decoder before successful decoding can begin and are generally not required thereafter, and hence represent overhead to compression, as this information will only be used by the decoder as it sets up to decode a bit stream. A decoder is first required to extract from an MPEG-2 transport stream a (1) program association table "PAT" packet indicating the PID of a PMT; (2) a program map table "PMT" packet, indicating the PIDs of the video and audio streams, and (3) a video sequence start code indicating the sequence resolution, frame rate, decoding matrices, etc., all prior to beginning to decode the first picture delivered to it.

Additionally, each distribution system typically has a channel change latency specific to the network, such as demodulator frequency changes for cable and satellites, and multicast join time for multicast-based video on IP systems. All the aforementioned delays in aggregate can cause a viewer to experience time delays of up to several seconds when changing a channel. This delay is often a source of frustration and annoyance for viewers of video programming attempting to rapidly channel surf, and further may cause friction between subscriber viewers (customers) and video broadcast providers.

Digital video streams herein are discussed and described with reference to the MPEG standard, however, those skilled the art should readily appreciate that the present invention may be adapted for use in conjunction with other video compression and transmission formats (such as H.264 for instance).

Exemplary Environment

FIG. 1 illustrates an exemplary environment 100 within which the present invention can be either fully or partially implemented. Environment 100 includes a content distribution network 102, which is typically a broadband over internet protocol (IP) network. For example, content distribution network 102 may be a cable, satellite, Digital Subscriber Line, fiber-optic-to-home, data, and/or a combination of any of the aforementioned types of content distribution networks. Portions of network 102 may be wired or wireless, and use any suitable topology. Content distribution network 102 may also include or be coupled to other networks 104, such as the Internet or an intranet.

Content is typically distributed from a head-end server 106 of network 102. Content may include any pre-recorded content from a storage device 103, such as television programs, movies, videos, and commercials. Content may also include broadcast content (including live and prerecorded content) received from a broadcast feed 105. In either event the content is typically encoded and transmitted as a source video stream (such an MPEG format) and may be a multicast video stream, or other types of video streams.

Various intermediary nodes 108(1), 108(2), . . . , 108(N) may distribute source multicast video streams containing encoded content from head-end server 106. For example, a router (not shown) may be used to route the multicast video stream to various destinations. Other intermediary nodes may include additional routers, switches, and servers. In a telephony provider communications network embodiment, the intermediary nodes 108 may include one or more Digital Subscriber Line Access Multiplexers (DSLAMs), which are multiplexers that receive one or more video streams at a central office location at an edge 112 of network 102, and distribute the streams to many customers' end-user equipment (a presentation device 116) via a communications link 114. Typically, the communications link 114 between network edge 112 and a presentation device 116 has limited bandwidth.

While some of the embodiments herein are discussed and described with reference to DSLAMs, those skilled in the art will readily appreciate that the present invention may be adapted for use in conjunction with any type of edge node including servers, routers, switches, satellite transmitters, and other suitable nodes for distributing content from the edge of a network to an end-user.

Presentation device 116 may include any device used to decode an encoded video stream. Presentation device 116 may be implemented as a separate device, such as a set-top-box 117, a satellite receiver (not shown), a modem (not shown) or other devices which are connected to a display device such as a TV 119. Presentation device 116 may also be integrated with as part of display device (as shown in FIG. 1) such as a TV 119, computer (not shown) or monitor (not shown) which has a screen 118 for rendering and displaying content (audio and/or video content).

Presentation device 116 may include ports (not shown) for receiving data from and transmitting data to network 102. Typically, data received from network 102 includes multicast video streams. Presentation device 116 is able to tune (or request) certain video streams from network 102, each video stream usually corresponding to a program channel. A user is typically able to request a channel i.e., desired video-stream content corresponding to the requested channel, usually via a remote 120 or other control means. When the user issues a request to select a video stream associated with a channel, a message is transmitted from presentation device 116 to node 108(2) via link 114, which is a point-to-point connection. In response node 108(2) selects the video stream associated with the request and delivers the requested video stream to presentation device for display.

Normally, a channel change cannot occur until an access point in the video stream is received, which can take several seconds to randomly receive, and decode. From the perspective of the user that issued the channel change request, this can lead to a several second delay between when the request is made, and when the first images of video content corresponding to the channel request are rendered and displayed. During that time the screen 118 of TV 119 remains devoid of content except for possible program information.

Reduce Channel Change Delay

Figure 2:
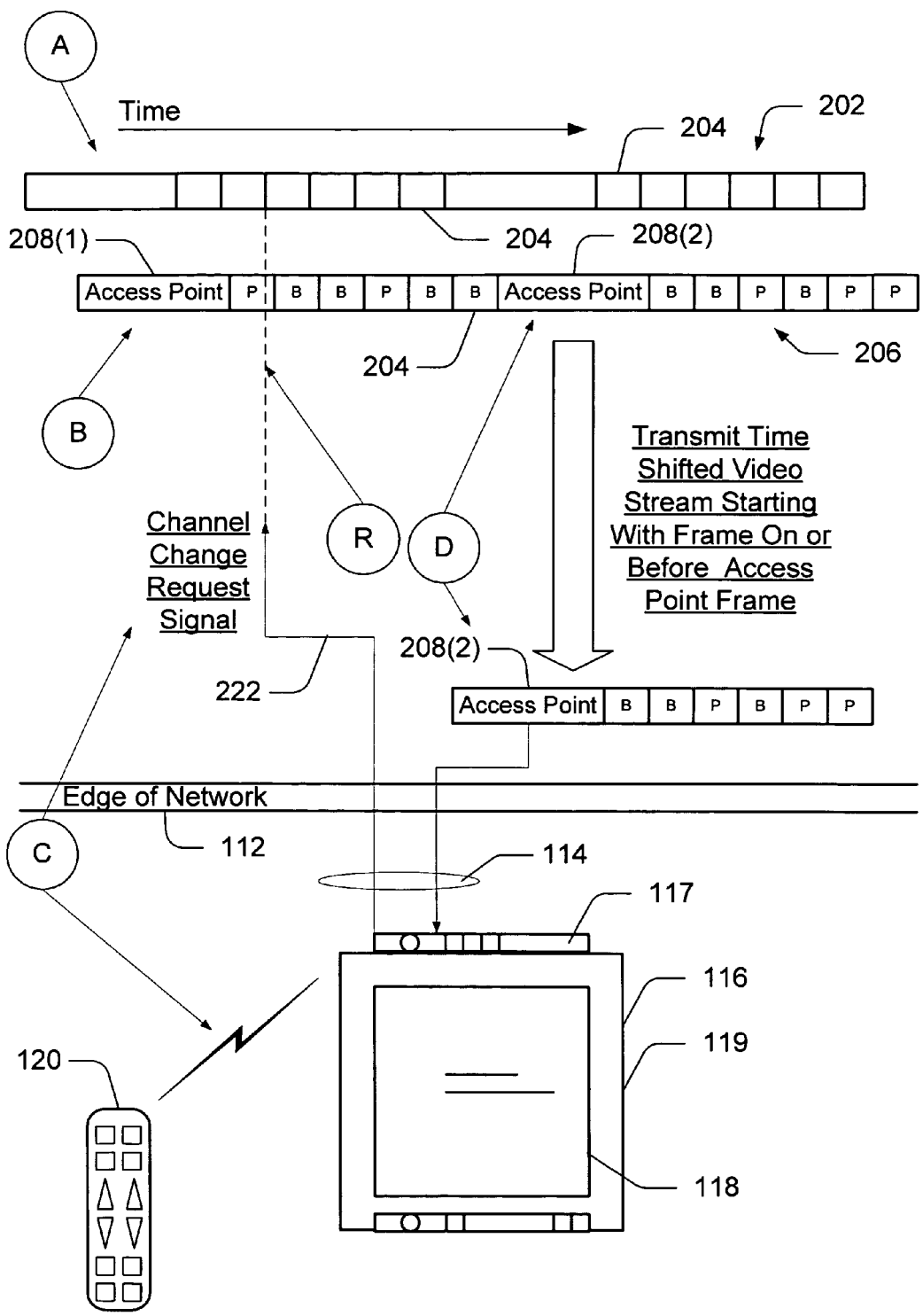
FIG. 2 is a logical illustration of a technique that may be used to reduce channel change delays.

FIG. 2 is a logical illustration of a technique that may be used to reduce channel change delays. This technique reduces the delay in the presentation of the first frames of the video content that occurs after a channel change request when a decoder joins a new multicast video stream. Although the exemplary illustration refers only to a single multicast video stream, it should be appreciated by those skilled in the art that the concepts described herein may apply to multiple incoming video streams: those in which it is desired to reduce channel change delays, and to changes to video streams distributed by other means, such as by broadcast and unicast methods.

A source video stream 202 received and/or propagated (Step A of FIG. 2) through network 102 (FIG. 1). In one embodiment, video stream 202 is a real-time multicast video stream which has been encoded for eventual transmission to a presentation device 116 via network 102. Video stream 202 typically contains multimedia content corresponding to a program channel, such as video and audio content of a content provider's channel. Video stream 202 is encoded using a digital video compression and transmission format, such as MPEG.

Next, in Step B video stream 202 (from Step A) is analyzed, access points and other information are identified and tracked. Step B also shows that source multicast video stream 202 is time shifted resulting in a time shifted video stream 206.

The analysis of video stream 202 includes parsing out frame locations of various pieces of information required to support a fast channel change (PAT, PMT, I-frame start, and possibly other data which is referred to as "fast-channel-change information"). That is, in Step B fast-channel-change information is identified and tracked as video stream 202 is transported within network 102.

This fast-channel-change information may then be distributed in-band within the transport stream. The fast-channel-change information, such as identifying access points, may be inserted into the MPEG bit-stream in several locations. In one embodiment, the fast-channel-change information may be inserted within additional "user information" fields of the video stream, which can be ignored by a standard (unmodified) decoder such as set-top-box 117. Alternatively, the fast-channel-change information may be inserted as an additional media type such as audio track 2 tags, which can also be ignored by an unmodified decoder. Still in another embodiment, it is possible to change the MPEG bit-stream to make it non-standard for purposes of inserting the fast-channel-change information. The latter embodiment may require modification of the decoder, however.

As shall be explained this analysis may be performed by various processing means, such as digital signal processors, located at one or more intermediary points within network 102, such as head-server 106 (FIG. 1), nodes 108 (FIG. 1), and/or any other nodes in a broadcast system network such as a router. For example, in one embodiment video stream 202 is analyzed in at least one node 108 (FIG. 1) prior to transmission to a set-top-box 117.

However, because each channel program (each video stream) is distributed throughout a broadcast system network 102 simultaneously, and information is often common to all, in an alternative embodiment, information may be generated once, upstream, such as head-end server 106 (FIG. 1) or at a content creation center 103, and then distributed to network elements such as various nodes 108 distributed throughout network 102 interspersed between network 102 and presentation devices 116.

As mentioned above, in step B, video stream 202 is time shifted resulting in time shifted video stream 204. Time shifting occurs as a result of analyzing video stream 202 and recording (e.g. storing) the fast-channel-change information. For example, in one embodiment video stream 202 is analyzed as described above, and written into memory 524 (FIG. 5) of node 108 as incoming packets (e.g. frames) are received, and then read at various times later as the packets are transported to a decoder 117. Preferably, the time delay between the video stream 202 and time shifted video stream 204 is minimized.

In Step C, a channel change request is received. That is, in one embodiment, an end-user, typically a subscriber, makes a request to change channels via a remote control 120. In response, decoder 117 sends a channel change request message (i.e., signal) 222 to network 102 such as node 108(2) shown in FIG. 1. The request is received at a point R in time. In another embodiment, the channel change request signal 222 can be generated, not by the decoder 117 as shown in FIG. 2, but by the service provider's system, such as head-end server 106 (FIG. 1) or node 108 (FIG. 1).

Next in Step D, a frame (or some other packet) of time shifted video stream 206 on or before an access point 208 is selected to commence the transmission of the time shifted video stream responsive to the channel change request. In one embodiment, a frame on or before the most recently received access point 208(2) is selected after point R, and forwarded to presentation device 116. By selecting the most recently received access point after a request, the time difference between "live" (video stream 202) and the start of time shifted video stream is minimized. The fast-channel-change information is used to select the frame(s) on or before the next available access point 208. It is noted that some frames prior to an access point 208 may be selected to provide the decoder 117 with some prior information such as B- or P-frames to more readily decode the video the first images of time shifted video stream 206.

Initial display of images associated with time shifted video stream 206 is reduced as compared to conventional systems, as information needed for immediate decoding is made immediately available to decoder 117. Thus, the user should experience presentation of video content on screen 118 shortly after 208(2) access point is received by decoder 117. That is, a decoder 116 is immediately able to start decoding a stream of packets with a least possible delay, minimized channel delay, and improved viewer experience. The end-user is unable to detect that their broadcast may be slightly delayed from the "live" video stream (the source multicast video stream 202).

Time shifted video stream 206 is thereafter continuously forwarded to the presentation device 116 for constant playback as long as device 116 remains tuned to the channel associated with video stream 202. There is no switch back to the "live" video stream. That is, no attempt is made to synchronize back from time shifted video stream of the requesting channel to the source multicast stream 202. There is little benefit in attempting to switch to the original multicast stream rather than a time shifted copy, as the link 114 between each presentation device 116 is not shared with any other presentation device as the link is a point-to-point connection. However, it is possible to re-synchronize with the non-buffered stream directly from the upstream network source in alternative embodiments.

In one embodiment, incoming frames of video stream 202 are tagged with an arrival time as they are received. After a channel change request is received f, and the information packets (PAT, PMT, etc) have been forwarded to the requesting decoder 117 for playback, a scheduling algorithm may be launched which calculates a time difference between current time and when the first packet of the last I-frame (or access point) was received. This time difference is used to transmit each successive packet sent thereafter maintaining the time difference as a constant.

Jitter introduced by network 102 up to edge 112 may not be removed as all packets are only delayed by a difference equal to the time difference, which does not affect any other parameters associated with jitter. Alternatively, a packet stream's PCR may be recovered and the packets transmitted using a clock may be de-jittered.

Methods of Operation

Figure 3:
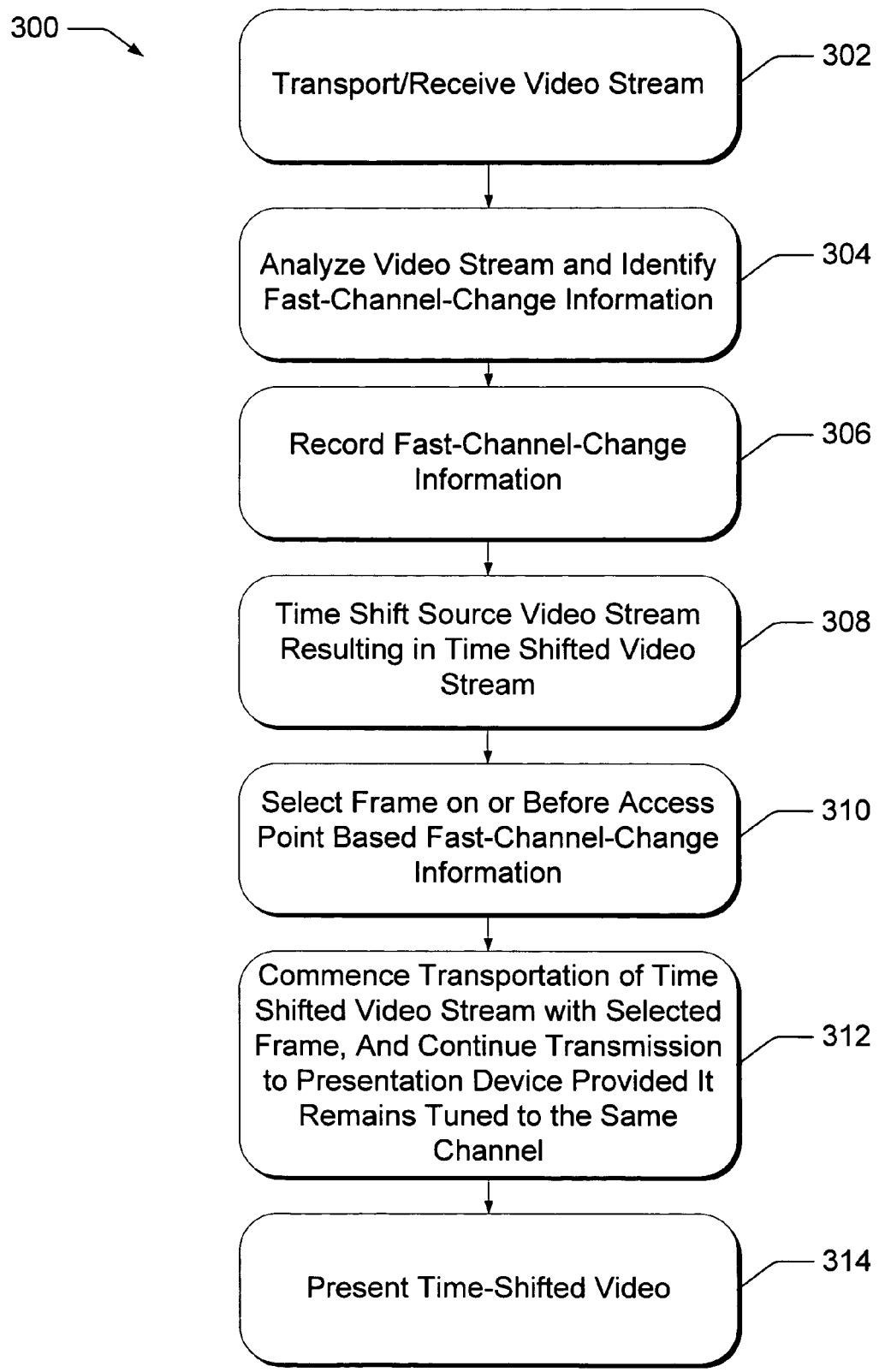
FIG. 3 illustrates an exemplary method for reducing channel change delays.

FIG. 3 illustrates an exemplary method 300 for reducing channel change delays. Method 300 includes blocks 302, 304, 306, 308 and 310 (each of the blocks represents one or more operational acts). The order in which the method is described is not to be construed as a limitation, and any number of the described method blocks can be combined in any order to implement the method. Furthermore, the method can be implemented in any suitable hardware, software, firmware, or combination thereof. Additionally, although each module in FIG. 3 is shown as a single block, it is understood that when actually implemented in the form of computer-executable instructions, logic, firmware, and/or hardware, that the functionality described with reference to it may not exist as a separate identifiable block.

Referring to FIG. 3, in block 302 a multicast video stream is transported in a broadband network. The multicast video stream is associated with a particular channel. For example, a multicast source video stream 202 received and/or propagated (Step A of FIG. 2) through network 102 (FIG. 1). Video stream 202 (FIG. 2) is a real-time multicast video stream which has been encoded for eventual transmission to a presentation device 116 via network 102.

In block 304, the multicast video stream is analyzed; access points and other information are identified and tracked. For example, video stream 202 (FIG. 2) is received by node 108 (FIG. 1) which analyzes the video stream 202 (FIG. 2) including parsing out frame locations of various pieces of information required to support a fast channel change like access points "fast-channel-change information". Access points, such as I-frames are the type of fast-channel-change information which is parsed from video stream 202.

In block 306, the fast-channel-change information is recorded. For example, the fast channel change information is recorded in-band within locations of a video stream or out-of-band in memory, such as memory 524 in FIG. 5.

In block 308, the multicast video stream is time shifted. For example, video stream 202 (FIG. 2) is recorded in memory 524 of node 108, resulting in time shifted video stream 204 (see also step B of FIG. 2). Time shifting occurs as a result of analyzing video stream 202, recording a copy of video stream 202 as a time shifted video stream 204, and recording (e.g. storing) the fast-channel-change information.

In block 310, a channel change request is received. For example, channel change request signal 222 (FIG. 2) is received from a decoder 117 (FIGS. 1 and 2) as a result of a user (i.e., viewer) tuning to specific channel, such as at a point R in FIG. 2.

In block 312, a frame of the time shifted video stream on or before the access point is selected. For example, based on the fast-channel-change information a point of access 208(2) (FIG. 2) is selected for by node 108 for immediate transmission to decoder 117.

In block 314, the time shifted video stream is continuously transmitted to the presentation device commencing with packets on or before the access point as selected in block 312. As used herein on or before means the selected access point itself or one or more frames/packets before a selected access point.

In block 316, the time shifted video stream is then presented. For example, video content is displayed on screen 118, shortly after frames on or before the access point is received by decoder 117. There is no switch back to the live video stream. It is noted that method 300 can be performed at various locations in network 102, including distributed in more than one processing node in a network.

Other Features and Exemplary Platforms

Figure 4:
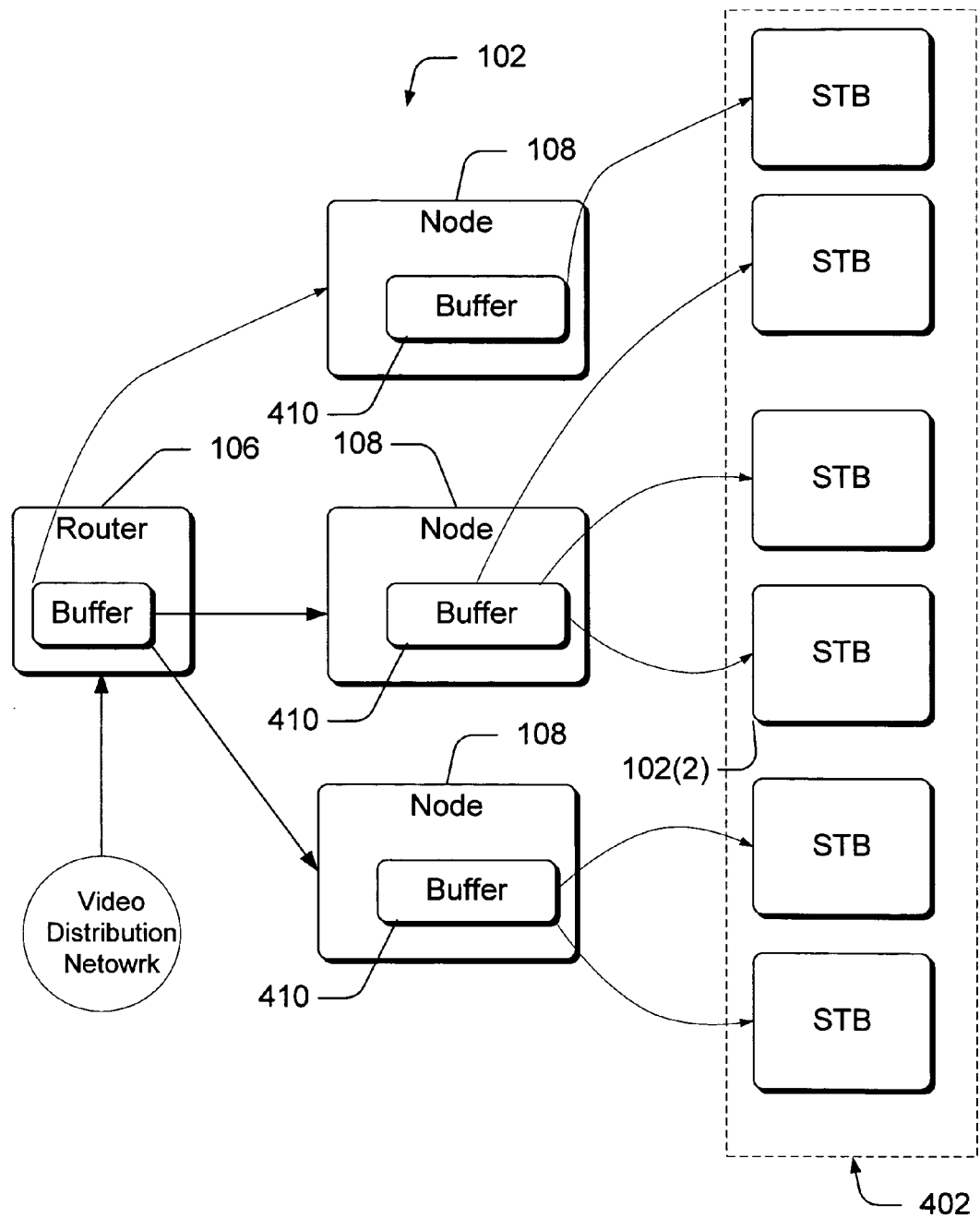
FIG. 4 illustrates a more detailed view of an environment in which channel change reduction techniques as described may be implemented.

FIG. 4 illustrates a more detailed view of an environment in which channel change reduction techniques as described may be implemented. At least one node 108 is interposed between a video distribution network 406 and end user equipment, such as Set Top Boxes (STBs) 402(1), 402(2), . . . 402(N).

Node 108 represents any general or special purpose computing device such as a server and/or router, or which may be used in combination with other suitable intelligent devices including any network devices associated with network 106. For example, in one embodiment, node 108 may be implemented as a Digital Subscriber Line Access Multiplexer (DSLAM). Node 108 may also be implemented as a router or switch used in other network environments including cable, satellite, DSL, ISDN, fiber-to-home technologies and so forth. Accordingly, node 108 may be any node interposed between a broadcast provider's network and the customer premise equipment and vise versa.

Node 108 includes at least memory (logically represented as a buffer 410) with the ability to record a time shifted video stream such as time shifted video stream 206 (FIG. 2). Node 108 includes a control module (see 504 of FIG. 5) configured to detect upstream channel requests changes sent to network 102 by customer equipment devices. This causes node 108 to forward a time shifted video stream from network 102 to STBs 402.

Buffer 410 can be implanted as any type of random access memory. The capacity of buffer 410 may be increased or decreased depending on demand or by the total number of STBs 402 directly serviced by a node 108. A program clock reference (PCR) discontinuity message may be sent by node 108 to any STB 402 receiving a time shifted copy of the source multicast stream to warn the STB 402 that timing information may have changed. Alternatively, in another embodiment, such information may not be necessary (as well as the necessity to transmit the PAT and PMT packets), if the STB has a priori knowledge of the PID assignments for video and audio.

In still another embodiment, it is possible to reduce processing/timing overhead by grouping similar output streams forwarded to different STBs 402. This may involve determining first whether any other STBs are already receiving the same stream requested by the STB which making the channel change request. If so, an I-frame (or other point of access) directed to the STB already receiving the stream may be sent to the requesting STB, if the next I-frame is located within an acceptable time period. Otherwise, immediate transmission of buffered I-frames may be sent instead. In this way the cost of not having the absolutely minimum channel change time, may afford the node 108 time to support a higher throughput overall, as output timing scheduling is reduced.

Supposing a node 108 can support approximately 1000 STBs (this number may vary higher or lower depending on the implementation), there is a high probability that at least one viewer watching each of the majority of popular program channels is relatively high. As the node 108 will already be receiving this stream channel changing will be naturally fast, as all information can be immediately sent from a downstream feed of packets.

However, there is chance that a program is unwatched by any viewer, at which point the typical slow channel change may be a default mode of operation. Possible solutions to this problem are to accept the problem, or have node 108 connected to receive all available programs. The latter may be constrained by network bandwidth capacities.

It is noted that the time shifting may be performed by other elements within the network 102, such as within a router 106 (also referred to as the head-end server) and which feeds one or more nodes 108 having links with STBs 402. It is anticipated in such an implementation, that several nodes 108 (perhaps several to several hundreds) will be fed by at least one central router, such as router 106.

Figure 5:
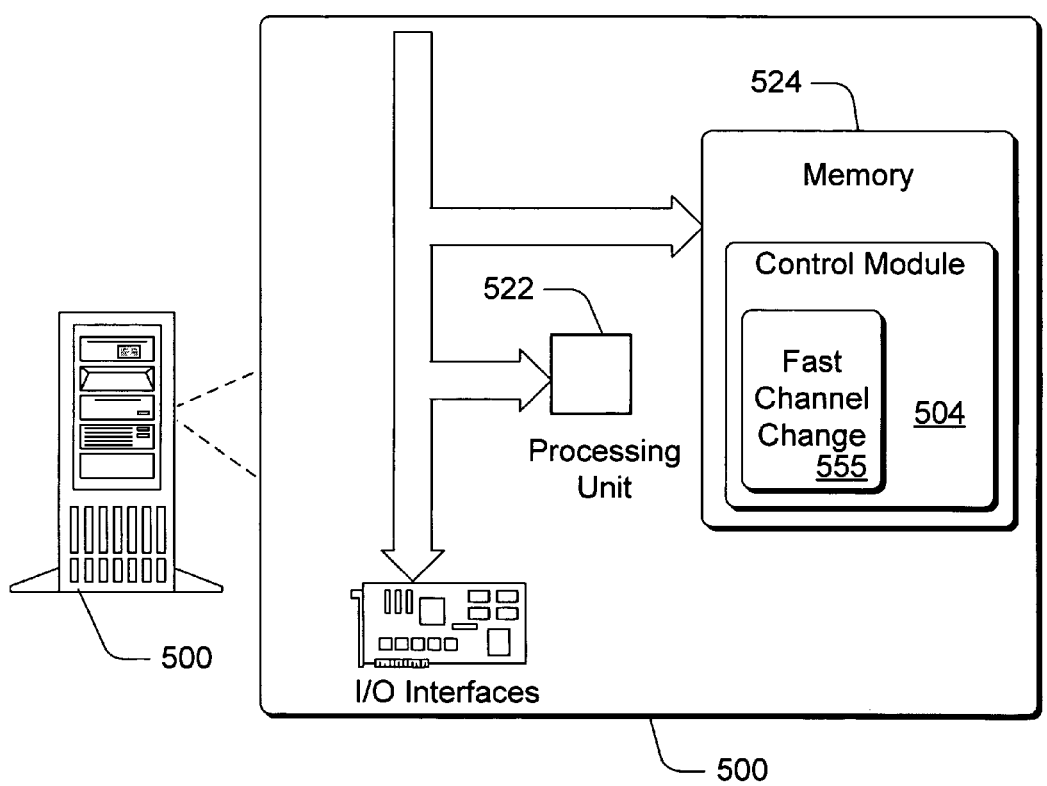
FIG. 5 illustrates an exemplary physical representation of a computer platform used to implement functionality performed by any intermediary node to reduce channel change delays.

FIG. 5 illustrates an exemplary physical representation of a computer platform used to implement functionality performed by any intermediary node to reduce channel change delays, such as node 108 (FIG. 1).

In particular, computer platform 500 represents any general purpose or special purpose computing system with modifications to hardware, firmware, and/or software. Computer platform 500 is only one example of computer platform and is not intended to suggest any limitation as to the scope of use or functionality of any system or method described herein. Neither should the computer platform 500 be interpreted as having any dependency or requirement relating to any one or combination of components described herein.

Computer platform 500 includes a control module 504, which controls the operation of platform 500. Control module 504 can be implemented in hardware, firmware, logic, software, or any combination of thereof. In the illustrative exemplary implementation control module 504 is implemented as a program module that may be described in the general context of computer-executable instructions, being executed by a computer, i.e., one or more processors in a processing unit 522. Control module 504 resides in memory 524.

Memory 524 typically includes a variety of computer readable media. Such media can be any available media that is accessible by computer platform 500 and includes both volatile and non-volatile media, removable and non-removable media. The computer-readable media provide non-volatile storage of computer readable instructions, data structures, program modules, and other data for computer platform 500. Any number of program modules can be stored in the computer readable media of memory 524, including one or more portions of control module 504. For example, a fast channel change program module 555, that performs the techniques and methods described with reference to FIGS. 2-4 above may reside therein. Such a program module 555 when executed, by a computer, may perform in at least in part, a method of (i) analyzing a multicast video stream before the multicast video stream is relayed to a presentation device; (ii) identifying where at least one access point in the multicast video stream is located; and (iii) forwarding information indicating where the at least one access point is located based upon the identification.

It is also noted that portions of control module 504 may be stored in a remote memory storage device remote from computer platform 500. Additionally, even though control module 504 is illustrated herein as a discrete block, it is recognized that any of these components may reside at various times in different storage components of computer platform 500 and are executed by one or more processors of a computer, such as processing units 522.

It is also noted that this invention may be applied in any situation where the selection between video streams is performed. For example, these techniques may be employed by a decoder which has available to it a number of video streams continuously, either by intelligent prediction of the user's next action, such as during channel surfing, or by dint of the delivery means, such as in the case of the broadcast nature of a cable television service.

Further, it should be noted that the change request may be initiated by an entity other than the decoder. Examples of alternative control sources would be when the invention is used within a device to insert commercial advertising into television programs and when the service operator wishes to dynamically redirect a customer to a source of content.

It is to be understood that the present invention is not limited to the embodiments described above, but encompasses any and all embodiments within the scope of the subjoined Claims and their equivalents.

What is claimed is:

1. A method for reducing channel change delays, comprising:
   transporting a video stream containing a plurality of frames including access points and non access points;
   associating frames of the video stream with a time tag;
   receiving a channel change request associated with the video stream from a receiving device;
   identifying an access point in the video stream including analyzing frames of the video stream by parsing out fast channel change information from the frames of the video stream;
   selecting a frame of the video stream on or before the access point;
   determining a time difference between a current time and the time tag associated with the selected frame;
   time shifting the video stream in accordance with the time difference resulting in a time shifted video stream; and
   transmitting the time shifted video stream to the receiving device on a continuous basis for so long as the receiving device remains tuned to the channel corresponding to the channel change request.

2. The method as recited in claim 1, wherein time shifting the video stream includes storing the video stream in random access memory prior to transmission.

3. The method as recited in claim 1, comprising storing information associated with the identification of the at least one access point.

4. The method as recited in claim 1, further comprising inserting information associated with the identification of at least one access point within the time shifted video stream.

5. The method as recited in claim 1, further comprising inserting information associated with the identification of at least one access point within a media type packet of the time shifted video stream.

6. The method as recited in claim 1, further comprising inserting information associated with the identification of at least one access point in a message 1 packet which is separate from the time shifted video stream.

7. The method as recited in claim 1, further comprising discontinuing the transmitting of the time shifted video stream when no receiving device remains tuned to the channel associated with the received channel change request.

8. The method of claim 1 comprising:
   transmitting a message to the receiving device indicating the time shifting of the video stream.

9. The method of claim 8, wherein the message includes a program clock reference (PCR) discontinuity message.

10. The method of claim 1 comprising:
    transmitting a program association table, a program map table, and a video sequence start code to the receiving device.

11. The method of claim 1 comprising:
    receiving a further channel change request associated with the video stream from a further receiving device; and
    transmitting the time shifted video stream to the further receiving device.

12. A non-transitory computer-readable medium having computer-executable instructions that, when executed by a computer perform a method comprising:
    analyzing a video stream associated with a channel change request from a receiving device before the video stream is relayed to the receiving device, the video stream containing a plurality of access points and non access points;
    associating frames of the video stream with a time tag;
    identifying where at least one access point in the video stream is located;
    selecting a frame of the video stream on or before an access point;
    time shifting the video stream in accordance with a time difference between a current time and the time tag associated with the selected frame resulting in a time shifted video stream; and
    transmitting the time shifted video stream to the receiving device on a continuous basis for so long as the receiving device remains tuned to the channel corresponding to the channel change request.

13. A medium as recited in claim 12, further comprising inserting the information indicating where the at least one access point is located into the video stream after the analysis.

14. A medium as recited in claim 12, further comprising receiving a channel change request and transmitting a time shifted video stream associated with the channel change request.

15. A medium as recited in claim 12, further comprising sending the information indicating where the at least one access point is located out of band from the video stream after the analysis.

16. A system for reducing delay associated with the initial presentation of video content after a channel change request, comprising:
    means for analyzing frames of a video stream associated with a channel change request from a receiving device to identify locations of access points in the video stream prior to relaying the video stream to the receiving device, the video stream containing a plurality of access points and non access points;
    means for associating frames of the video stream with a time tag;
    means for selecting a frame of the video stream on or before an access point;

means for time shifting the video stream in accordance with a time difference between a current time and the time tag associated with the selected frame; and means for transmitting the time shifted video stream to the receiving device on a continuous basis for so long as the receiving device remains tuned to the channel corresponding to the channel change request.

17. The system as recited in claim 16, wherein the means for transmitting the time shifted video stream to the receiving device further includes one or multiple output ports configured to transmit multiple copies of the time shifted video stream to multiple receiving devices.

18. The system as recited in claim 16, wherein information indicating the locations of the access points is forwarded in-band with the time shifted video stream.

19. The system as recited in claim 16, wherein information indicating the locations of the access points is forwarded out-of-band from the time shifted video stream.

20. The system as recited in claim 16, wherein the means for analyzing frames of a video stream and the means for transmitting the time shifted video are located remotely from each other in separate communication nodes of a video content distribution network.

\* \* \* \* \*